US009602676B2

(12) United States Patent
Lehane et al.

(10) Patent No.: US 9,602,676 B2
(45) Date of Patent: *Mar. 21, 2017

(54) SYSTEM AND METHOD FOR ENABLING INTERACTIONS BETWEEN A POLICY DECISION POINT AND A CHARGING SYSTEM

(71) Applicant: Openet Telecom Ltd., Dublin (IE)

(72) Inventors: Bart Lehane, Dublin (IE); Alan McNamee, Dublin (IE); Andrew D'Souza, Silver Spring, MD (US); Cameron Ross Dunne, Kildare (IE)

(73) Assignee: OPENET TELECOM LTD., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,595

(22) Filed: Sep. 24, 2015

(65) Prior Publication Data

US 2016/0014279 A1   Jan. 14, 2016

Related U.S. Application Data

(63) Continuation of application No. 13/751,495, filed on Jan. 28, 2013, now Pat. No. 9,173,081.
(Continued)

(51) Int. Cl.
*H04M 11/00*   (2006.01)
*H04M 15/00*   (2006.01)
(Continued)

(52) U.S. Cl.
CPC ........... *H04M 15/65* (2013.01); *H04M 15/64* (2013.01); *H04M 15/66* (2013.01);
(Continued)

(58) Field of Classification Search
CPC .... H04M 15/64–15/66; H04M 15/765; H04W 4/24; H04W 4/26
(Continued)

(56) References Cited

U.S. PATENT DOCUMENTS 6,167,445 A   12/2000  Gai et al.
6,308,216 B1  10/2001  Goldszmidt et al.
(Continued)

FOREIGN PATENT DOCUMENTS

EP   2 242 205 A1   10/2010
EP   2 262 199 A1   12/2010
(Continued)

OTHER PUBLICATIONS

P. Calhoun et al., Diameter Base Protocol, Network Working Group, Request for Comments: 3588, Category: Standards Track, Sep. 1, 2003.
(Continued)

*Primary Examiner* — Mong-Thuy Tran
(74) *Attorney, Agent, or Firm* — The Marbury Law Group, PLLC

(57) ABSTRACT

A system and method for managing group-based charging for network usage and spending. A server computing device that includes an offline charging system (OFCS) component may be configured to receive a communication message that includes a first attribute, determine/identify a group of user equipments that includes a first user equipment device that is associated with the received communication message, and determine a charging attribute state for the determined group of user equipments based on the first attribute and a second attribute associated with a second user equipment device in the group of user equipments. The server may apply a charging event, determine whether the charging attribute state of the group of user equipments changed as a result of
(Continued)

applying the charging event, and notifying a listener component of a new charging attribute state in response to determining that the charging attribute state of the group of user equipments changed.

21 Claims, 12 Drawing Sheets

Related U.S. Application Data

(60) Provisional application No. 61/591,497, filed on Jan. 27, 2012.

(51) Int. Cl.
 *H04W 4/26* (2009.01)
 *H04W 4/24* (2009.01)

(52) U.S. Cl.
 CPC ........... *H04M 15/765* (2013.01); *H04W 4/24* (2013.01); *H04W 4/26* (2013.01)

(58) Field of Classification Search
 USPC ............................ 455/408, 405, 406; 705/52
 See application file for complete search history.

(56) References Cited

U.S. PATENT DOCUMENTS

| | | | |
|---|---|---|---|
| 6,363,420 B1 | 3/2002 | Coward | |
| 6,427,173 B1 | 7/2002 | Boucher et al. | |
| 6,862,281 B1 | 3/2005 | Chandrasekaran | |
| 7,107,334 B1 | 9/2006 | Shaffer et al. | |
| 7,197,546 B1 | 3/2007 | Bagga et al. | |
| 8,023,425 B2 | 9/2011 | Raleigh | |
| 8,548,428 B2 | 10/2013 | Raleigh | |
| 2002/0068546 A1* | 6/2002 | Plush | H04M 15/00 455/406 |
| 2002/0150094 A1 | 10/2002 | Cheng et al. | |
| 2002/0169712 A1* | 11/2002 | Ginzboorg | G06Q 20/00 705/39 |
| 2003/0065812 A1 | 4/2003 | Beier et al. | |
| 2003/0195919 A1 | 10/2003 | Watanuki et al. | |
| 2004/0088437 A1 | 5/2004 | Stimac | |
| 2004/0199406 A1 | 10/2004 | Owens et al. | |
| 2005/0191989 A1 | 9/2005 | Plush et al. | |
| 2006/0047836 A1 | 3/2006 | Rao et al. | |
| 2006/0085549 A1 | 4/2006 | Hasti et al. | |
| 2006/0165053 A1 | 7/2006 | Bhatnagar et al. | |
| 2006/0271813 A1 | 11/2006 | Horton et al. | |
| 2007/0143442 A1 | 6/2007 | Zhang et al. | |
| 2007/0153995 A1 | 7/2007 | Fang et al. | |
| 2007/0160183 A1* | 7/2007 | Shaw | H04L 12/14 379/114.03 |
| 2007/0258460 A1 | 11/2007 | Momtahan et al. | |
| 2007/0283011 A1 | 12/2007 | Rakowski et al. | |
| 2007/0297583 A1 | 12/2007 | Shan | |
| 2008/0046573 A1 | 2/2008 | Ropolyi et al. | |
| 2008/0117869 A1 | 5/2008 | Freen et al. | |
| 2008/0183991 A1 | 7/2008 | Cosmadopoulos et al. | |
| 2008/0212602 A1 | 9/2008 | Hobbs et al. | |
| 2008/0216148 A1 | 9/2008 | Bienek et al. | |
| 2008/0240150 A1 | 10/2008 | Dias et al. | |
| 2009/0025010 A1 | 1/2009 | Foottit et al. | |
| 2009/0049201 A1 | 2/2009 | Albert et al. | |
| 2009/0063650 A1 | 3/2009 | Anslow et al. | |
| 2009/0075626 A1* | 3/2009 | Shan | H04M 15/00 455/406 |
| 2009/0119742 A1 | 5/2009 | Graziani et al. | |
| 2009/0228611 A1 | 9/2009 | Ferguson et al. | |
| 2009/0249452 A1 | 10/2009 | Burke et al. | |
| 2009/0280773 A1 | 11/2009 | Karlsson | |
| 2009/0285179 A1 | 11/2009 | Jones et al. | |
| 2009/0305684 A1 | 12/2009 | Jones et al. | |
| 2010/0017603 A1 | 1/2010 | Jones | |
| 2010/0023699 A1 | 1/2010 | Reidel et al. | |
| 2010/0035576 A1 | 2/2010 | Jones et al. | |
| 2010/0042449 A1 | 2/2010 | Thomas | |
| 2010/0188975 A1 | 7/2010 | Raleigh | |
| 2010/0197266 A1 | 8/2010 | Raleigh | |
| 2010/0287080 A1 | 11/2010 | Thistle et al. | |
| 2011/0044353 A1 | 2/2011 | Foottit et al. | |
| 2011/0075671 A1 | 3/2011 | Davidson et al. | |
| 2011/0124313 A1 | 5/2011 | Jones | |
| 2011/0191826 A1* | 8/2011 | Ballal | H04L 63/104 726/4 |
| 2011/0208628 A1 | 8/2011 | Foottit et al. | |
| 2011/0211465 A1 | 9/2011 | Farrugia et al. | |
| 2011/0275344 A1 | 11/2011 | Momtahan et al. | |
| 2011/0276442 A1 | 11/2011 | Momtahan et al. | |
| 2011/0280130 A1 | 11/2011 | Foottit et al. | |
| 2012/0026879 A1 | 2/2012 | Foottit et al. | |
| 2012/0084425 A1 | 4/2012 | Riley et al. | |
| 2012/0088470 A1 | 4/2012 | Raleigh | |
| 2012/0109800 A1 | 5/2012 | Zhou et al. | |
| 2012/0113855 A1 | 5/2012 | Wu et al. | |
| 2012/0131165 A1 | 5/2012 | Baniel et al. | |
| 2012/0233324 A1 | 9/2012 | Zhou et al. | |
| 2013/0044646 A1 | 2/2013 | Qu et al. | |
| 2013/0188554 A1* | 7/2013 | Cai | H04M 15/65 370/328 |
| 2015/0011182 A1* | 1/2015 | Goldner | H04M 15/66 455/406 |

FOREIGN PATENT DOCUMENTS

| | | |
|---|---|---|
| EP | 2 346 210 A1 | 7/2011 |
| EP | 2 429 120 A1 | 3/2012 |
| WO | 02/06973 A1 | 1/2002 |
| WO | 2008/038862 A1 | 4/2008 |
| WO | 2009/129840 A1 | 10/2009 |
| WO | 2010/127593 A1 | 11/2010 |
| WO | 2010/141727 A1 | 12/2010 |

OTHER PUBLICATIONS

P. Eronen Ed. et al., Diameter Extensible Authentication Protocol (EAP) Application, Network Working Group, Request for Comments: 4072, Category: Standards Track, Aug. 31, 2005.

J. Wood et al., A Web Services Architecture for Visualization, Fourth IEEE International Conference on eScience, IEEE Computer Society, Dec. 7, 2008.

J. Korhonen Ed. et al., Clarifications on the Routing of Diameter Requests Based on the Username and the Realm, Network Working Group, Request for Comments: 5729, Updates: 3588 Category: Standards Track, Dec. 31, 2009.

http://www.3gpp.org, 3rd Generation Partnership Project; Technical Specification Group Services and System Aspects; Policy and Charging control architecture (Release108), 3GPP TS 23.203 V10.1.0, Sep. 29, 2010. Valbonne, France.

http://www.3gpp.org, 3rd Generation Partnership Project; Technical Specification Group Core Network and Terminals; Policy and Charging Control signalling flows and Quality of Service (QoS) parameter mapping (Release 8), 3GPP TS 29.213 V8.9.1, Oct. 4, 2010. Valbonne, France.

V. Fajardo, Ed. Et al., Diameter Base Protocol draft-ietf-dime-rfc3588bis-33.txt, Network Working Group, Internet-Draft, Obsoletes: 3588 5719 (if approved), Intended status: Standards Track, May 7, 2012. (Expires: Nov. 8, 2012).

European Search Report dated Mar. 26, 2012, issued in EP Application No. 11193496, mailed on Apr. 2, 2012.

European Search Report dated Mar. 20, 2012, issued in EP Application No. 11193537, mailed on Apr. 2, 2012.

European Search Report dated Mar. 8, 2012, issued in EP Application No. 11193476, mailed on Apr. 2, 2012.

European Search Report dated Mar. 12, 2012, issued in EP Application No. 11193460, mailed on Apr. 11, 2012.

European Search Report dated Mar. 14, 2012, issued in EP Application No. 11193499, mailed on Apr. 11, 2012.

(56) References Cited

OTHER PUBLICATIONS

European Search Report dated May 25, 2012, issued in EP Application No. 11193561, mailed on Jun. 4, 2012.
European Search Report dated Jul. 31, 2012, issued in EP Application No. 12165563, mailed on Aug. 6, 2012.
European Search Report dated Sep. 26, 2012, issued in EP Application No. 12165576, mailed on Oct. 4, 2012.
European Search Report dated Jul. 31, 2012, issued in EP Application No. 12165566, mailed on Aug. 28, 2012.
European Search Report dated Aug. 8, 2012, issued in EP Application No. 12165569, mailed on Aug. 16, 2012.
European Search Report dated Aug. 24, 2012, issued in EP Application No. 12165572, mailed on Sep. 3, 2012.
U.S. Appl. No. 13/309,333, filed Dec. 1, 2011, entitled "Methods, Systems and Devices for Forked Routing".
U.S. Appl. No. 61/537,419, filed Sep. 21, 2011, entitled "Mobile Application Server that Enables Users to Directly Access Telecommunications Operator Services".
U.S. Appl. No. 61/479,136, filed Apr. 26, 2011, entitled "Mobile Application Server that Enables Users to Directly Access Telecommunications Operator Services".
U.S. Appl. No. 61/546,818, filed Oct. 13, 2011, entitled "Mobile Application Server that Enables Users to Directly Access Telecommunications Operator Services".
U.S. Appl. No. 13/751,495, filed Sep. 24, 2015, entitled "System and Method for Enabling Interactions Between a Policy Decision Point and a Charging System".

* cited by examiner

SYSTEM AND METHOD FOR ENABLING INTERACTIONS BETWEEN A POLICY DECISION POINT AND A CHARGING SYSTEM

RELATED APPLICATIONS

This application is a continuation of U.S. patent application Ser. No. 13/751,495, titled "System and Method for Enabling Interactions between a Policy Decision Point and a Charging System" filed Jan. 28, 2013, which claims the benefit of priority to U.S. Provisional Application No. 61/591,497, titled "System and Method for Enabling Interactions Between a Policy Decision Point and an Offline Charging System" filed Jan. 27, 2012 the entire contents of all of which are hereby incorporated by reference.

BACKGROUND

Wireless and cellular communication technologies have seen dramatic improvements over the past few years. Cellular service providers now offer users a wide array of services, higher usage limits and attractive subscription plans. Wireless dongles and embedded wireless modem cards allow users to use tablet computers, netbooks and laptops to access wireless Internet protocol (IP) and data services through the cellular networks. User Equipment (UE), such as Internet-enabled smart phones, tablets and gaming consoles, have become essential personal accessories, connecting users to friends, work, leisure activities and entertainment. Users now have more choices and expect to have access to content, data and communications at any time, in any place. As more users utilize these services, telecommunication system operator networks must expand to meet the increase in user demand, support the array of new services and provide fast, reliable communications.

As telecommunications operators upgrade to next generation network technologies and as subscribers consume increasing amounts of high-bandwidth content via their UEs across fixed and wireless networks, there is a growing need for both telecommunications network operators and their subscribers to better monitor their network usage and related spending.

Existing solutions for tracking usage and spending are generally focused on prepaid customers, and are typically implemented in an online charging system (OCS) of a policy and charging control network. As operators deploy new and additional policy management systems and solutions in their networks, the focus of tracking solutions will shift from prepaid customers and the OCS, to enabling interactions between charging systems and policy management systems to enforce policies (e.g., lowering data speeds, limiting access to content/applications, etc.) in the telecommunications network based on the subscriber's spending limits, credit state, user-defined parental controls, and other subscriber- or charging-related information. Accordingly, improving the architecture of policy and charging systems to better support interactions between online and offline charging systems and policy management systems will be beneficial to network operators and their consumers.

SUMMARY

The various embodiments include methods of managing group-based charging for network usage and spending in a communications network, which may include receiving in a processor a subscription request that includes a charging attribute from a listener component, determining whether the subscription request identifies a group of user equipments, determining the group of user equipments to which a user equipment associated with the subscription request belongs when it is determined that the subscription request does not identify a group of user equipments, determining an identity of at least one other user equipment in the group of user equipments, and determining a charging attribute state for the group of user equipments based on the charging attribute.

In an embodiment, the method may include receiving a charging event that identifies a user equipment from a charging component, applying the charging event, determining whether the user equipment identified in the charging event is a member of the group of user equipments identified in the subscription request, determining whether the charging attribute state of the group of user equipments has changed, and notifying the listener component that the charging attribute state of the group of user equipments identified in the subscription request has changed. In a further embodiment, the listener component may be a policy management system component. In a further embodiment, the user equipment may be a machine-to-machine device. In a further embodiment, the charging component may be a policy enforcement system component. In a further embodiment, the charging event may relate to a service in a circuit switched domain. In a further embodiment, determining a charging attribute state for the group of user equipments based on the charging attribute may include obtaining charging information associated with multiple user equipments from multiple sources relating to multiple services.

In a further embodiment, the multiple sources may include at least one online charging system and at least one offline charging system. In a further embodiment, determining a charging attribute state for the group of user equipments based on the charging attribute may include aggregating charging information associated with all user equipments within the group of user equipments. In a further embodiment, determining whether the subscription request identifies a group of user equipments may include determining whether the subscription request identifies a group related to a corporate account. In a further embodiment, determining a charging attribute state for the group of user equipments based on the charging attribute may include returning the charging attribute state to the listener component. In a further embodiment, notifying the listener component that the charging attribute state of the group of user equipments identified in the subscription request has changed may include notifying the listener component of a new charging attribute state.

Further embodiments include a server configured for managing group-based charging for network usage and spending in a communications network, including a network interface, and a server processor configured with processor-executable instructions to perform operations including receiving in a processor a subscription request that includes a charging attribute from a listener component, determining whether the subscription request identifies a group of user equipments, determining the group of user equipments to which a user equipment associated with the subscription request belongs when it is determined that the subscription request does not identify a group of user equipments, determining an identity of at least one other user equipment in the group of user equipments, and determining a charging attribute state for the group of user equipments based on the charging attribute. In an embodiment, the server processor may be configured with processor-executable instructions to perform operations further including receiving a charging event that identifies a user equipment from a charging component, applying the charging event, determining whether the user equipment identified in the charging event is a member of the group of user equipments identified in the subscription request, determining whether the charging attribute state of the group of user equipments has changed, and notifying the listener component that the charging attribute state of the group of user equipments identified in the subscription request has changed.

Further embodiments include a non-transitory server-readable storage medium having stored thereon server-executable configured cause a server to perform operations for managing group-based charging for network usage and spending in a communications network including receiving in a processor a subscription request that includes a charging attribute from a listener component, determining whether the subscription request identifies a group of user equipments, determining the group of user equipments to which a user equipment associated with the subscription request belongs when it is determined that the subscription request does not identify a group of user equipments, determining an identity of at least one other user equipment in the group of user equipments, and determining a charging attribute state for the group of user equipments based on the charging attribute. In an embodiment, the stored server-executable instructions may be configured cause a server to perform operations further including receiving a charging event that identifies a user equipment from a charging component, applying the charging event, determining whether the user equipment identified in the charging event is a member of the group of user equipments identified in the subscription request, determining whether the charging attribute state of the group of user equipments has changed, and notifying the listener component that the charging attribute state of the group of user equipments identified in the subscription request has changed.

Further embodiments may include a computing device having a processor configured with processor-executable instructions to perform various operations corresponding to the methods discussed above.

Further embodiments may include a computing device having various means for performing functions corresponding to the method operations discussed above.

Further embodiments may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "wireless device" and "user equipment (UE)" may be used interchangeably and refer to any one of various cellular telephones, smart-phones (e.g., iPhone®), personal data assistants (PDA's), palm-top computers, tablet computers, laptop computers, wireless electronic mail receivers (e.g., Blackberry®), VoIP phones, wire-line devices, devices implementing Machine-to-Machine (M2M) technologies, multimedia/Internet enabled cellular telephones, and similar electronic devices capable of sending and receiving wireless communication signals. A wireless device may include a programmable processor and memory. In a preferred embodiment, the wireless device is a cellular handheld device (e.g., a mobile device), which can communicate via a cellular telephone communications network.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of signaling and content messages. It should be understood that any references to terminology and/or technical details related to an individual standard or technology are for illustrative purposes only, and are not intended to limit the scope of the claims to a particular communication system or technology unless specifically recited in the claim language.

Figure 1:
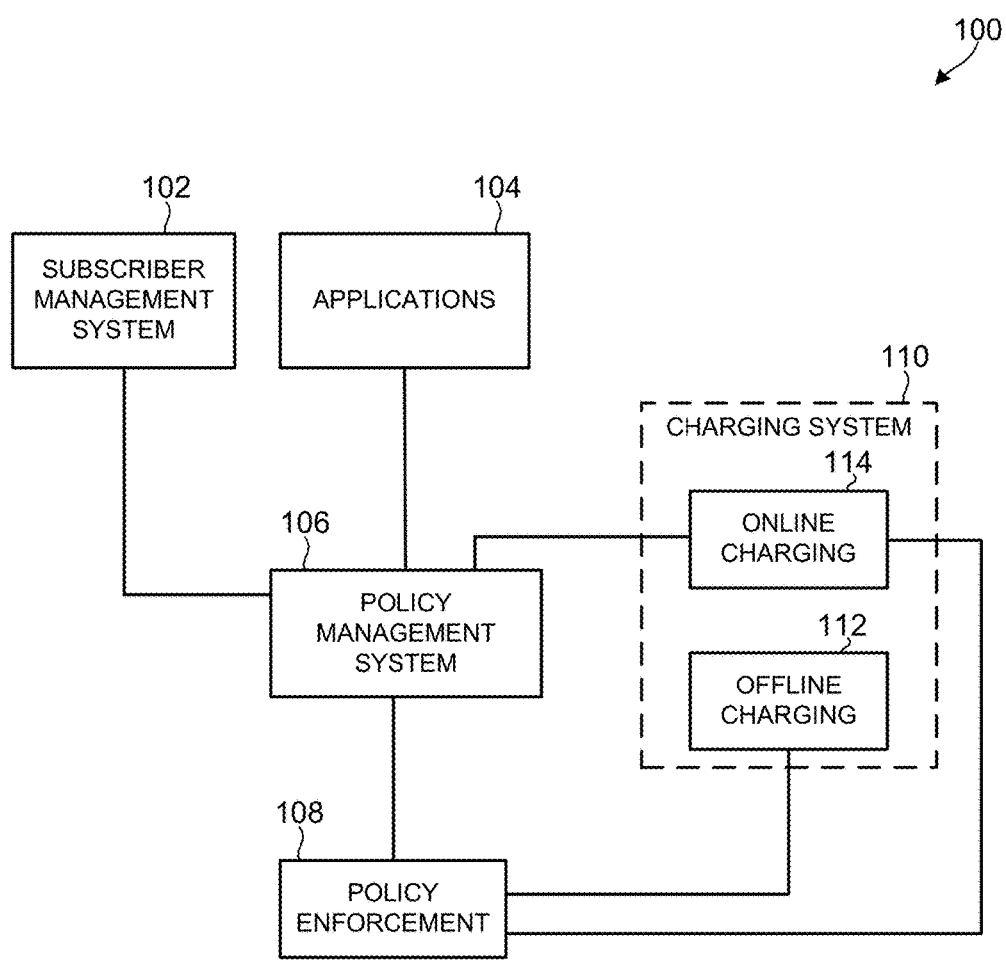
FIG. 1 is a network system diagram of a current state architecture for policy and charging controls in a telecommunications network.

FIG. 1 illustrates logical components in the current state architecture for policy and charging controls in a prior art telecommunications network. The illustrated network 100 includes a subscriber management system 102, an applications 104 component, policy management system 106, policy enforcement component 108, and a charging system 110 that includes an off-line charging 112 component and an on-line charging 114 component.

Figure 2:
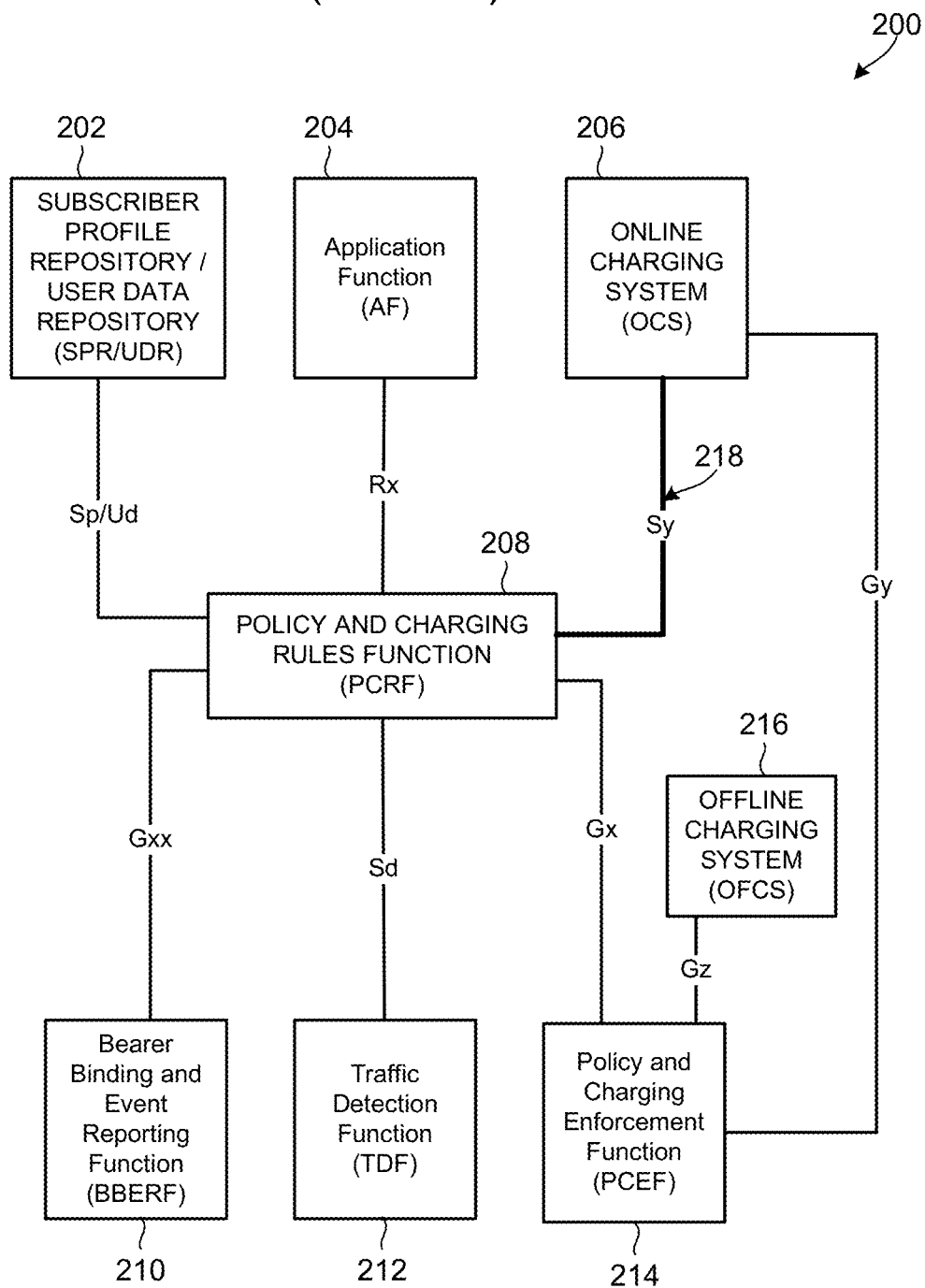
FIG. 2 network system diagram of another current state architecture for policy and charging controls in a telecommunications network.

FIG. 2 illustrates an embodiment of the network 200 architecture illustrated in FIG. 1, which is the standard 3GPP Policy and Charging Controls (PCC) architecture for a mobile telecommunications network. The example illustrated in FIG. 2 is based on 3GPP Release 11. The illustrated PCC network 200 may include one or more components for a subscriber profile repository (SPR) 202, an application function (AF) 204, an on-line charging system (OCS) 206, a policy charging rules function (PCRF) 208, a bearer binding and event reporting function (BBERF) 210, a traffic detection function (TDF) 212, a policy and charging enforcement function (PCEF) 214, and an off-line charging system (OFCS) 216.

FIG. 2 illustrates that existing networks 200 may include an Sy reference point 218 between the PCRF 208 and the OCS 206. Currently, an operator's OCS 206 typically manages only prepaid subscribers and as a result applying dynamic policy controls to postpaid subscribers requires enhancements to the current state architectures and networks 100, 200.

As telecommunications operators' deployment of policy management systems continues to evolve, especially in the mobile network domain, it is becoming increasingly clear that gaps exist in some areas of the existing standards and the policy and charging control (PCC) reference architecture.

Among these gaps, the current standards do not accommodate scenarios in which policy controls may be required for subscribers who are unknown to the OCS 206; in general, these would be post-paid subscribers whose network usage is not managed by the OCS 206. There is no defined reference point or prescribed interface between a Policy Management System and the OFCS 216, and existing OFCS 216 are typically unable to track subscriber usage and spending in a similar manner to the OCS 206.

Another issue addressed by the various embodiments is that standards do not provide for an ability to address group of user equipments based thresholds (i.e., thresholds based on groups). This gap in the standards exists regardless of whether the subscribers are charged using an online charging system or an offline charging system.

The various embodiment systems, servers, and methods overcome these and other limitations of existing solutions by providing an Enhanced Charging System (ECS) capable of tracking subscriber usage and spending as the services are being consumed in the network. The various embodiments may also include a new reference point and interface between a policy management system and the ECS. This interface enables notifications to be triggered between the ECS and policy management system when certain conditions have been met, such as when a subscriber's spending threshold has been exceeded. In various embodiments, all or portions of the enhanced charging system, interface, and/or reference point may be implemented in a server of a telecommunications network as software, hardware, or any combination thereof. In various embodiments, one or more portions of the enhanced charging system, interface, and/or reference point described herein may be implemented as software instructions executing on a processor of a computing device, such as a network server.

While the description of the various embodiments use terminology from 3GPP's mobile networks and systems architecture, various embodiments may be extended to and deployed across other network domains, such as fixed-line (e.g., TISPAN and BBF), cable (e.g., PacketCable), WiMax (e.g., WiMax Forum) and so on. Furthermore, a single deployment of this invention may support multiple instances of the network domains mentioned above.

Figure 3:
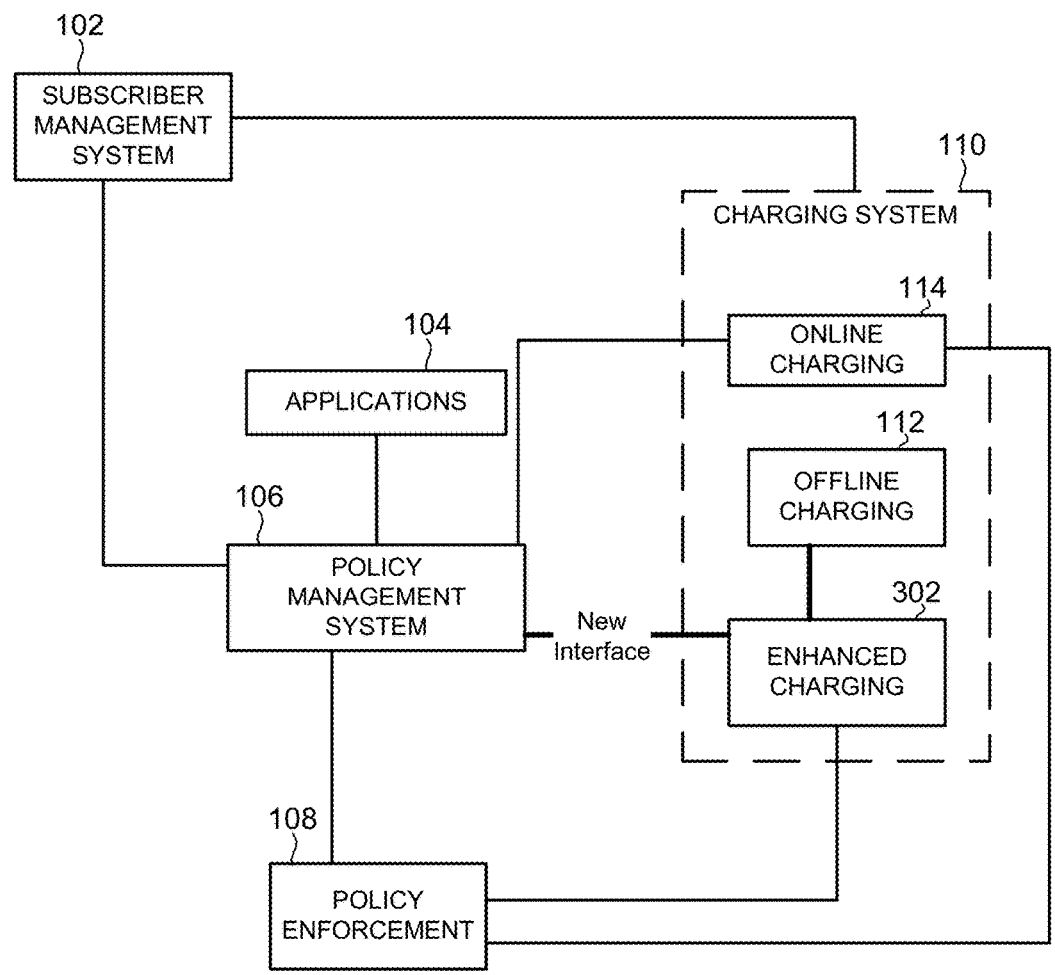
FIGS. 3-6 are network system diagrams of policy and charging controls in a telecommunications network according to various embodiments.

An example architecture according to an embodiment of this invention is illustrated in FIG. 3. The main components of the architecture, as shown in FIG. 3 are discussed below.

FIG. 3 illustrates that the policy and charging network may include an Enhanced Charging 302 component that may collect information from multiple network and other sources, process the collected information, and distribute the data to one or more downstream systems within the operator's OSS/BSS environment, or to systems that are external to the operator.

Network elements or components may send charging detail records to the Enhanced Charging 302 component and the SPR 202 provides subscriber information.

The enhancements to the existing OFCS 216 introduced by the Enhanced Charging 302 component may include a rating function, a spend velocity calculator, and a spend monitor.

The Enhanced Charging 302 component may also trigger spend notifications, for example to the Policy Management System 106 over the newly introduced interface.

In various embodiments of this invention, the Enhanced Charging System may be a Charging Gateway Function (CGF) or a Mediation System or a Billing System, which supports existing charging and also the new enhanced functions included in the ECS.

The Policy Management System 106 component determines the policies that regulate subscribers' use of the telecommunications operator's network. These policies may be mandated by the telecommunications operator, or they may be selected and configured by subscribers.

The Policy Management System 106 receives spend notifications from the Enhanced Charging 302 component system over the newly introduced interface, and uses configured rules to trigger messages to subscribers and to implement appropriate policy actions on the subscriber's currently ongoing or subsequent network activity.

In the preferred embodiment of a 3G or 4G mobile network, the Policy Management System 106 is referred to as a Policy and Charging Rules Function (PCRF).

In the preferred embodiment of a 3G or 4G mobile network, the proposed new reference point between the PCRF and the ECS may be labeled Sz.

In other embodiments of this invention the Policy Management System 106 may be a Resource and Admission Control Subsystem (RACS), or a Broadband Policy Control Function (BPCF), or a PacketCable Application Manager (PAM) and Policy Server (PS).

The Online Charging System component applies rules that establish whether subscribers are authorized to use a service, monitors their ongoing use of that service, determines the charges associated with consumption of network resources, and whether subscribers' account balances are sufficient to support that use of the service.

The Subscriber Management System component manages and maintains information relating to subscribers. Some of this information is permanently managed by this component, such as user specific preferences. Additionally, this component can retrieve information from other components within the telecommunications operator's network and OSS/BSS environment. In the preferred embodiment of a 3G or 4G mobile network, the Subscriber Management System is referred to as a Subscriber Profile Repository (SPR) or a User Data Repository (UDR).

Figure 4:
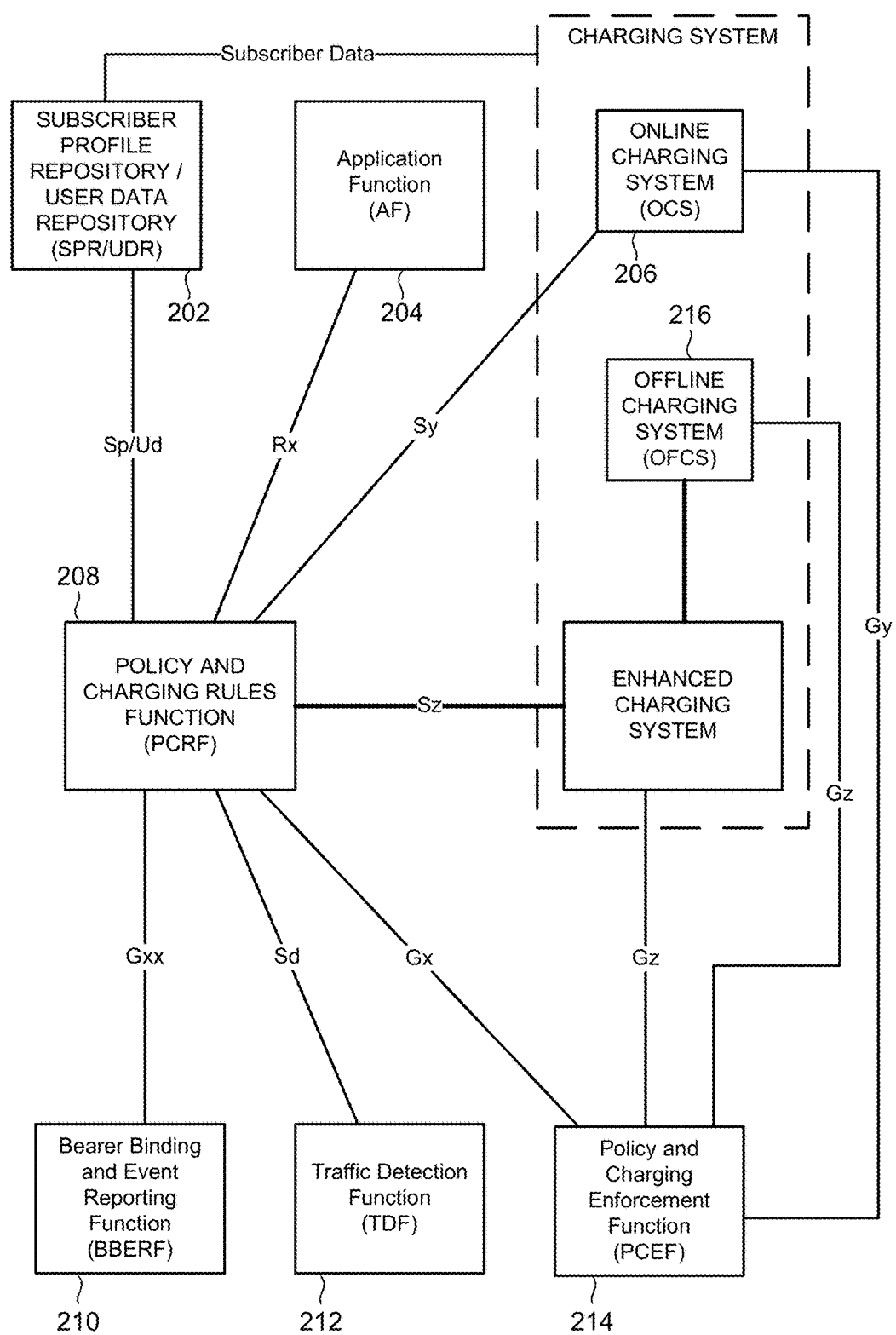

FIG. 4 illustrates the architecture for the 3GPP embodiment of this invention for 3G or 4G mobile networks.

Figure 5:
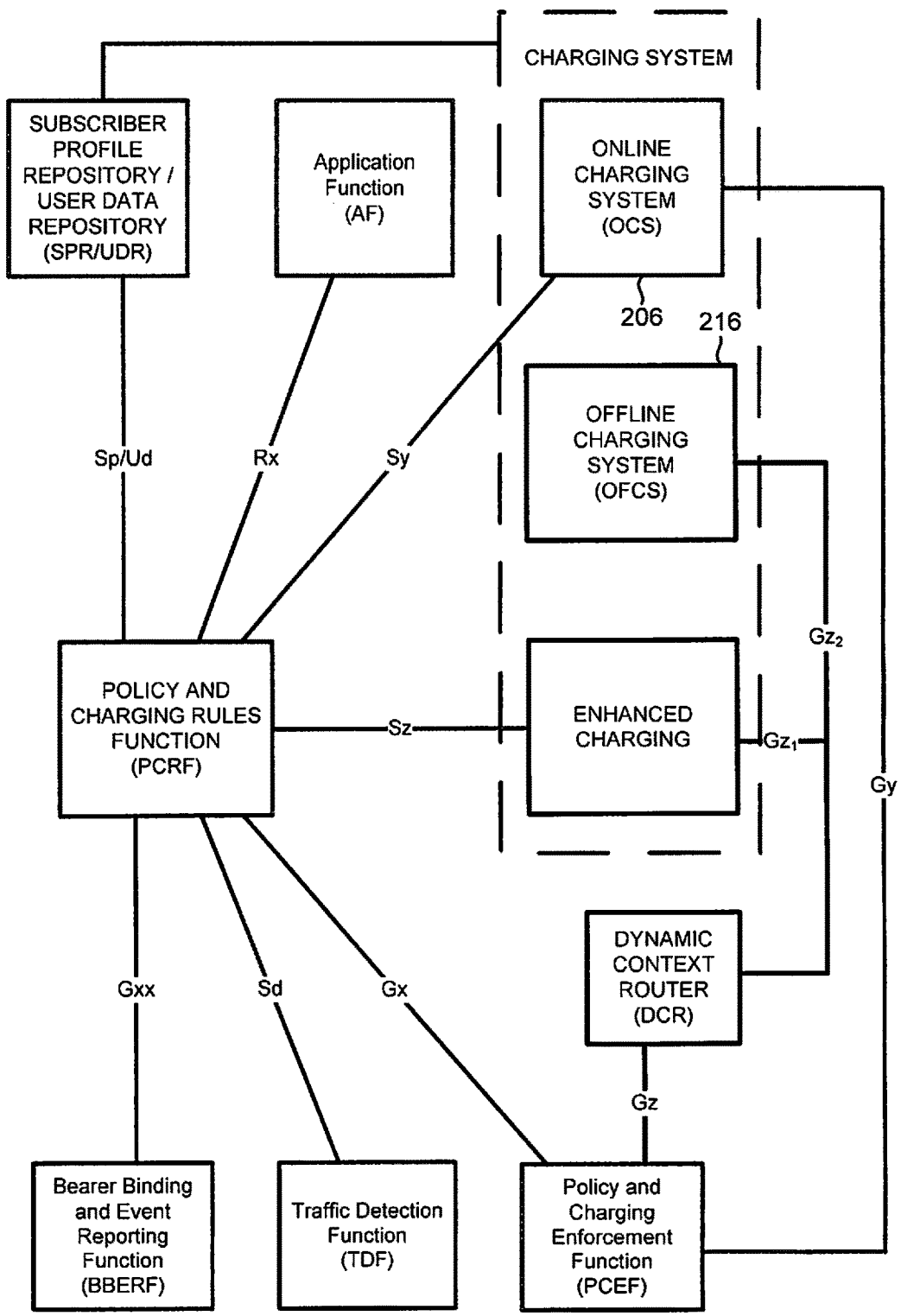

FIG. 5 shows the 3GPP PCC architecture for alternative embodiments of this invention for 3G or 4G mobile networks.

In an embodiment, the ECS may be deployed as a separate or adjunct component from the OFCS. In such a deployment, the ECS supports only the enhanced functions while the OFCS continues to perform all existing offline charging functions. In this embodiment, the Gz messages are exchanged between the PCEF and the OFCS via the ECS such that the OFCS does not need to be modified (not shown in FIG. 5).

In an embodiment, messages exchanged in the various functions may be "forked" in which the message is sent to more than one destination. In FIG. 5 message forking is illustrated by the flows Gz1 and Gz2. A variety of known methods may be used to accomplish such message forking. In an embodiment, a Dynamic Context Router (DCR) component may be deployed across the Gz reference point, as shown in FIG. 5. In such an embodiment the DCR may fork Gz messages to the ECS and the OFCS. Details regarding fork routing by a DCR component are disclosed in U.S. patent application Ser. No. 13/309,333, titled "Methods, Systems and Devices for Forked Routing," filed on Dec. 1, 2011, relevant portions of which are incorporated herein by reference.

Figure 6:
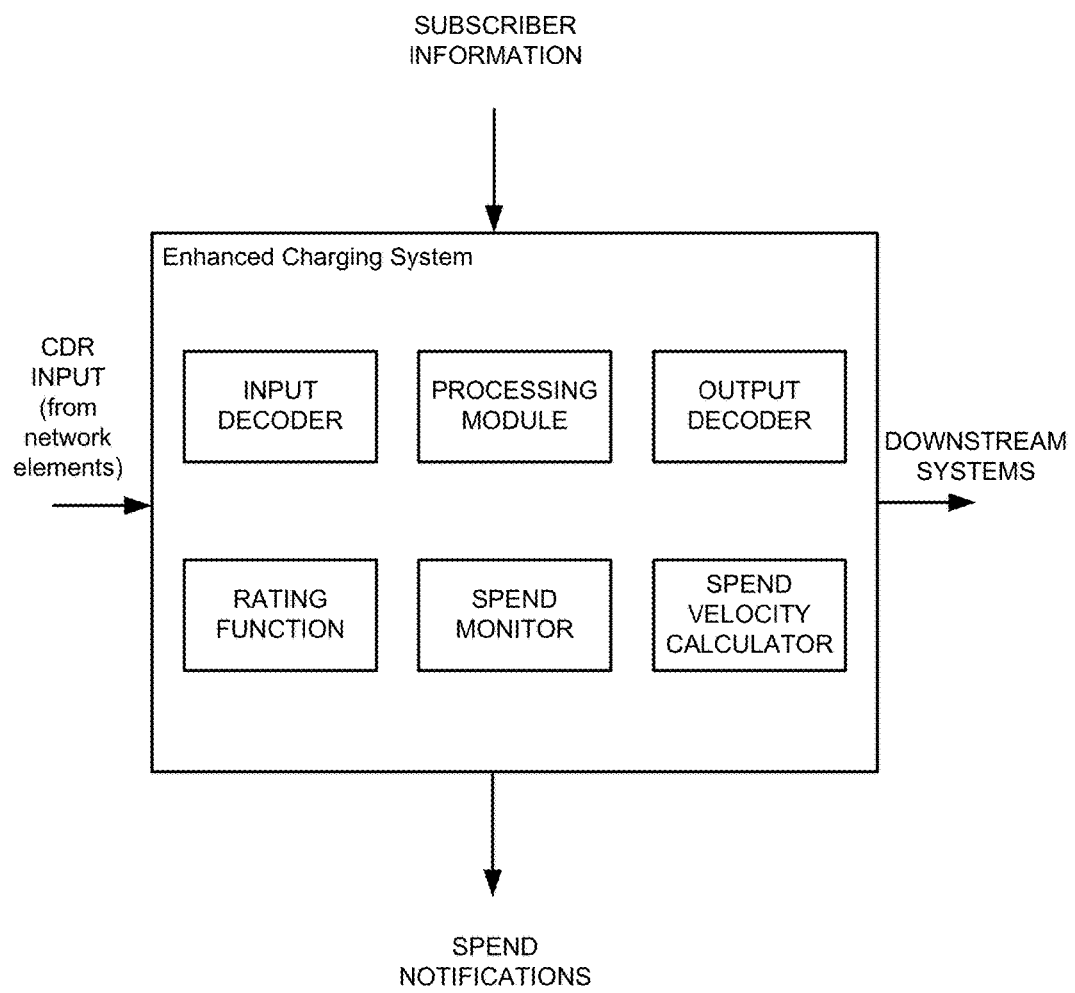

This invention introduces new components and interfaces to help address various challenges faced by operators as the next generation of telecommunications networks continue to evolve in scale and complexity:

FIG. 6 presents an overview of the architecture of the ECS. As shown in FIG. 6, the ECS supports multiple input and output data streams. These include the following streams.

CDR Input stream includes one or more channels for the delivery of Charging Data Records (CDRs) from network elements or other external systems to the ECS. The following protocols may be typically supported in the CDR Input stream: GTP'; DIAMETER; RADIUS; FTP; FTAM; and IPDR and IPDR/SP.

Subscriber Information stream is the mechanism for the ECS to access the subscriber information that it requires to perform its various functions. Subscriber information may be retrieved by the ECS and cached internally to improve system performance. Subsequent updates to subscriber information may be "pushed" to the ECS from the SPR/UDR. Examples of subscriber information available in this stream include Subscription Plan, Spending Limits, Credit Status, etc.

Downstream Systems feeds is a function via which one or more external systems receive information from the ECS. Among the systems that typically receive charging information are the billing system, partner settlements systems, data warehouses, etc. If the ECS is part of the billing system, then it may feed other systems within the operator's OSS/BSS domain.

Spend Notifications is the mechanism for delivering notifications related to subscriber spend events over a defined interface.

This notification interface may be implemented using various protocols, design paradigms and data formats, including for example: DIAMETER; SOAP/XML; XML-RPC; RESTful protocols; and JSON.

In an embodiment of this interface, the Policy Management System 106 may notify the ECS of certain network events, such as session failure or resource unavailability. The events may enable the ECS to trigger pro-active credits to the subscriber's account balance and corresponding credit notifications to the subscriber.

In an embodiment of this invention, notifications may be sent simultaneously to the operator's third-party partners to communicate the changes in subscriber account state. This may result in limits on the subscriber's ability to use a partner's services when, for example, certain credit conditions are exceeded.

Other key functions of the ECS are described below.

Input Decoder is a function that is responsible for receiving CDRs from the input stream, validating the information, and extracting the relevant attributes that are required by the Rating Function.

Processing Module is a module which coordinates all the processing steps for the incoming CDRs including, for example, look-ups of subscriber data that may be required to formulate a rating request for the Rating Function.

Rating Function is a module which determines the charge associated with each input CDR. The charge information may be used by other ECS components, such as the Spend Monitor and Spend Velocity Calculator.

In an embodiment, this charge may be permanently associated with the CDR and delivered to a downstream system as a "pre-rated" event.

In an embodiment, the Rating Function may automatically calculate credits to be applied to a subscriber's account when the Policy Management System 106 indicates to the ECS that service delivery did not meet the subscriber's Service Level Agreement targets. These credits may be monetary or service units (data volume, time, loyalty points, etc.) depending on the defined business rules.

Spend Monitor is a function that is responsible for tracking subscriber spending. This spending may be monitored at varying levels of granularity, for example: Per subscriber; for a family or group of user equipments; for each service for a subscriber; for each member of a family or group account; and so on.

Spend Velocity Calculator is a module which reports a subscriber's instantaneous spend velocity by sampling spending over a short period of time:

$$\text{Spend Velocity} = \lim_{\Delta t \to 0} \frac{\Delta s}{\Delta t} = \frac{ds}{dt}.$$

U.S. Provisional Application No. 61/537,419, titled "Mobile Application Server that Enables Users to Directly Access Telecommunications Operator Services" filed on Sep. 21, 2011, provides further details on the Spend Velocity Calculator function.

Subscribers' experience of this Invention is described in the following paragraphs.

This invention may be integrated with a Mobile Application Server (MAS) in order to provide subscribers with the spend notifications and also with visibility into their usage, for example, spend velocity.

Figure 7:
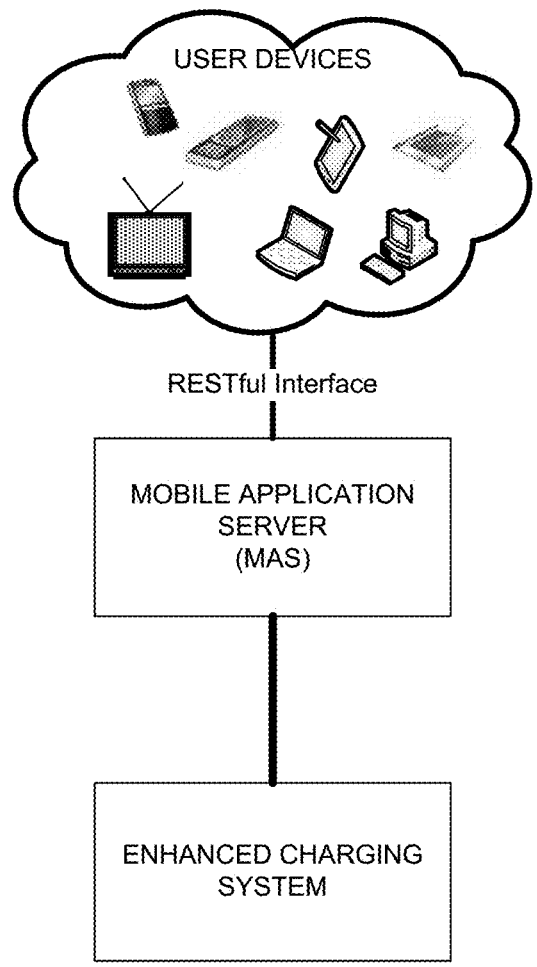
FIG. 7 is an architectural diagram illustrating components suitable for use with the embodiments.

FIG. 7 shows a high-level view of how the MAS and ECS may be integrated to deliver an enhanced user visibility into their usage patterns.

Further details on the MAS and its capabilities are disclosed in U.S. Provisional Application No. 61/479,136, titled "Mobile Application Server that Enables Users to Directly Access Telecommunications Operator Services", filed on Apr. 26, 2011, U.S. Provisional Application No. 61/537,419, titled "Mobile Application Server that Enables Users to Directly Access Telecommunications Operator Services", filed on Sep. 21, 2011, U.S. Provisional Application No. 61/546,818, titled "Mobile Application Server that Enables Users to Directly Access Telecommunications Operator Services", filed on Oct. 13, 2011, and U.S. patent application Ser. No. 13/309,333, titled "Methods, Systems and Devices for Forked Routing", filed on Dec. 1, 2011, the entire contents of all of which are hereby incorporated by reference.

Figure 9A:
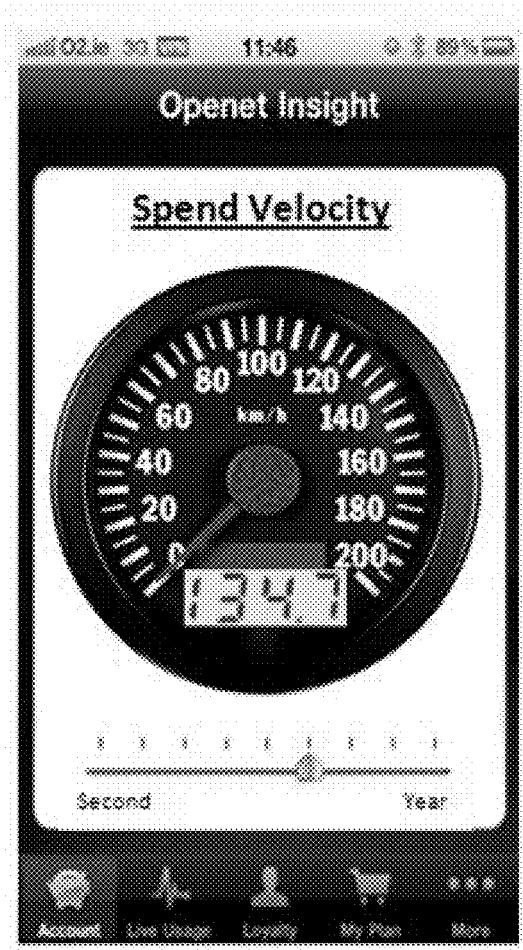
FIGS. 9A-B are screenshots of example user interface displays according to various embodiments.
Figure 9B:
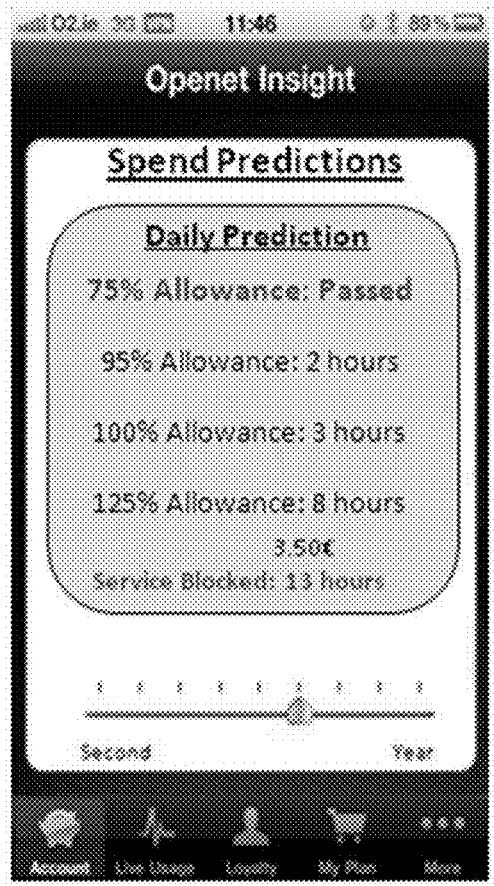

FIGS. 9A and 9B illustrate examples of user experience displays and user interfaces using ECS-MAS Integration according to an embodiment.

In an embodiment, the ECS may be new component that replaces (or is an enhancement to) and existing OCS/OFCS components.

In an embodiment, the ECS may be new component logically situated between the PCEF and the OCS/OFCS components so that the PCEF interacts with the ECS in the same manner as it would with the OFCS, and vice versa. Thus, in an embodiment, the ECS may be a man-in-the-middle component.

In an embodiment, the ECS may be a new component that receives Gz messages that have been forked from the original Gz messages between the PCEF and the OFCS. In this embodiment, the ECS and the PCRF may communicate using Sz.

Figure 8:
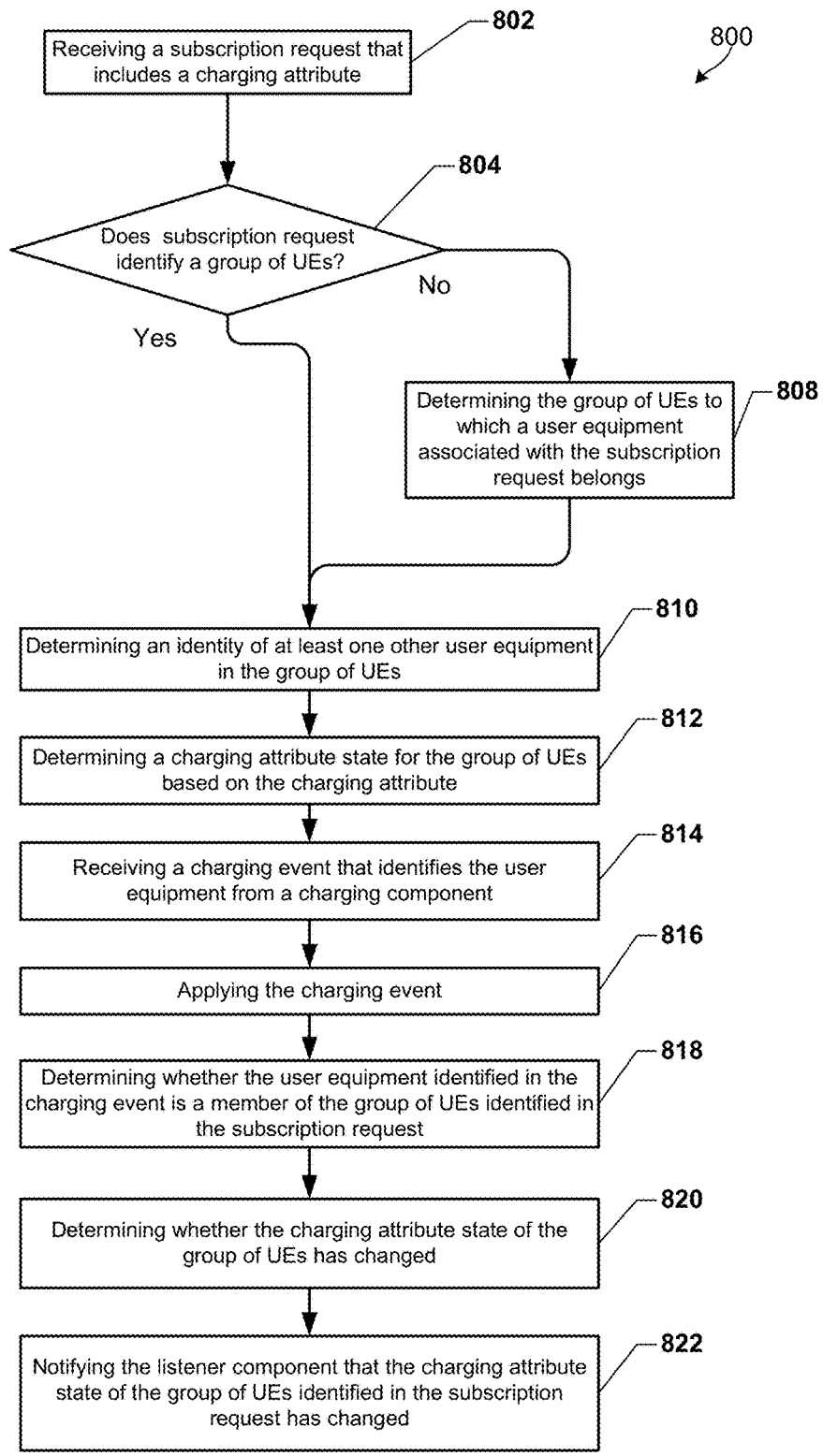
FIG. 8 is a process flow diagram illustrating an embodiment method.

An embodiment method 800 of managing charging network usage and spending in a communications network is illustrated in FIG. 8. The embodiment method 800 may include receiving in a processor a subscription request that includes a charging attribute from a listener component in block 802, and determining whether the subscription request identifies a group of user equipments (UEs) in determination block 804. If the subscription request does not identify a group of user equipments (i.e., determination block 804="No"), in block 808, the processor may determine the group of user equipments to which a user equipment associated with the subscription request belongs. When it is determined that subscription request does identify a group of user equipments (i.e., determination block 804="Yes"), in block 810, the processor may determine an identity of at least one other user equipment in the group of user equipments. Based on the identity of the at least one other user equipment and the charging attribute, the method further includes determining a charging attribute state for the group of user equipments in block 812. For example, if two members of a group of mobile devices have usages charges that total more than the charging threshold for the group, then there is no need to consider the charges of other users in the group. The method may further include receiving a charging event that identifies a user equipment from a charging component in block 814, applying the charging event in block 816, determining whether the user equipment identified in the charging event is a member of the group of user equipments identified in the subscription request in block 818, determining whether the charging attribute state of the group has changed in block 820, and notifying the listener component that the charging attribute state of the group of user equipments identified in the subscription request has changed in block 822.

In various embodiments, the charging attribute may relate to any aspect of charging, and each charging attribute may have many charging attribute states. For example, the charging attribute representing a group's spend in terms of its allowed overall spend may be "MonthlySpend", and the associated charging attribute states may be "50%", "75%", "90%", and "100%". Other charging attributes may represent usage levels of a particular service, spending thresholds while roaming, and frequency with which an account is paid.

In an embodiment, a listener node may send the identity of a group of user equipments (UEs). The identity may be a named group, and not a listing that forms a group. For example, the group representing all user equipments belonging to American Airlines might be "AmericanAirlines."

In an embodiment, the listener node may send the identity of a single user equipment. In an embodiment, the listener node may send a list of user equipment identities that it wants to be treated as a group. In an embodiment, such a list of user equipment identities may be created on an ad-hoc basis by the listener node, and thus the ECS may operate without requiring or using predefined group information.

In an embodiment, the ECS may expand a received list of user equipment identities. For example, if the ECS receives the list consisting of (A, B, C, D) then it may expand each of these user equipment identities into its own list to produce (A, (B, B', B"), C, (D, D')). This may be useful in scenarios where the listener node is interesting in receiving charging attribute state notifications relating to the group consisting of all user equipments belonging to the owners of the user equipments A, B, C and D. In an embodiment, this expansion may be controlled by a parameter in the subscription request from the listener node.

In various embodiments, the listener component may be a policy management system (e.g. PCRF), a notification server, analytics engine, presentation layer component (GUI/Portal), etc. In an embodiment, the listener component may be configured so as to not be time sensitive, and hence it may work when the charging system is an offline charging system (e.g. OFCS).

In various embodiments, user equipment may be a mobile phone, smart phone, tablet, laptop with dongle, M2M device, embedded device, etc.

In various embodiments, the charging component may be a policy enforcement system (e.g. PCEF), recharge component, a portal, an external component (e.g. a bank), a Charge Trigger Function (in 3GPP terminology).

In various embodiments, the charging event may relate to a voice usage, data usage, SMS, MMS, IM usage, debit transactions (e.g. mPayments), credit transactions (e.g. account top-up), plan change (upgrade, downgrade, etc.), etc.

In various embodiments, aggregating may include determining any of an average (e.g. the average monthly talk time for a group of users), count (e.g. the total number of users in a group who roamed in the month), maximum, median, minimum, mode, sum (e.g. the total number of SMS messages sent by a group of users), etc.

In various embodiments, the group may relate to a family, a corporate account for multiple users who share a common employer, a demographic (e.g. male teenagers), a single make and model of user equipments (e.g. Samsung Galaxy S3s), M2M devices belonging to a single person or entity (e.g. a fleet of vehicles owned by a delivery company), M2M devices providing a single service to many users (e.g. smart bins that report when they are full and thus reduce unnecessary collections), etc.

Figure 10:
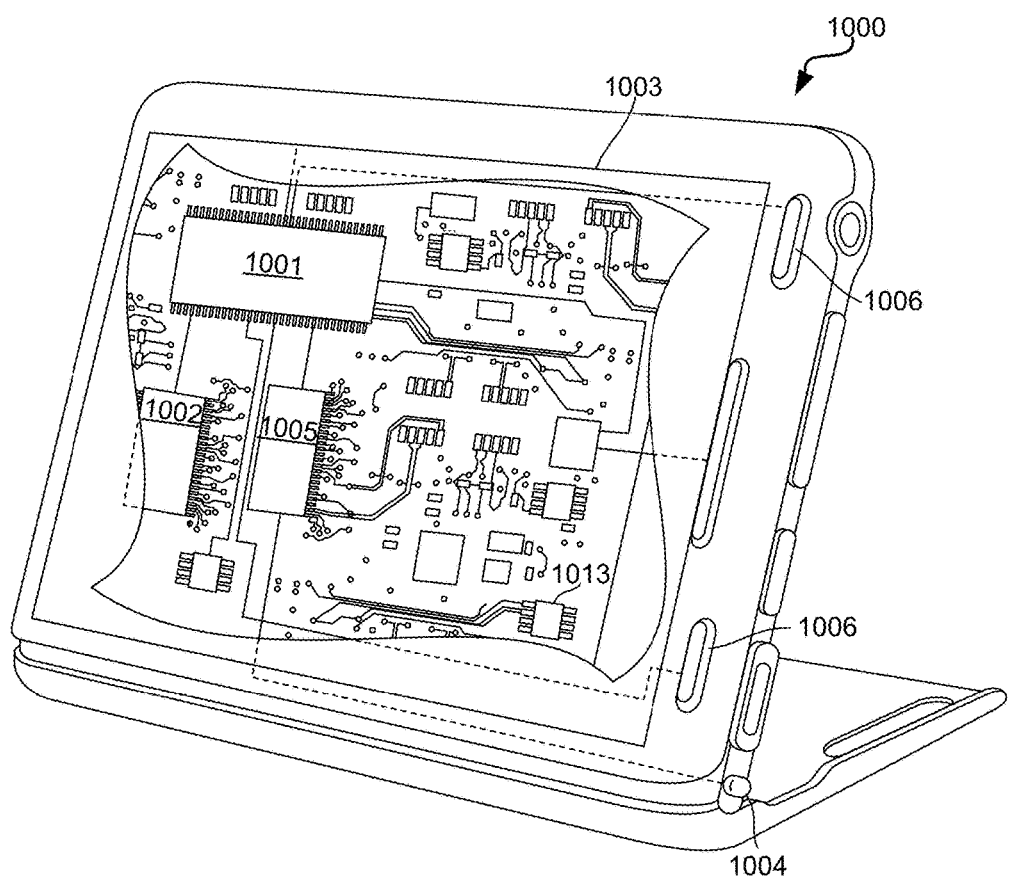
FIG. 10 is a system block diagram of a wireless communication device for use with various embodiments.

FIG. 10 is a system block diagram of a wireless communication device for use with any of the embodiments. The embodiments may be implemented in a variety of mobile wireless communication devices, particularly mobile computing devices. An example of a wireless communication device that may implement the various embodiments is a Smartphone 1000 illustrated in FIG. 10. A wireless communication device, such as a Smartphone 1000, may include a processor 1001 coupled to memory 1002 and to a radio frequency data modem 1005. The modem 1005 may be coupled to an antenna 1004 for receiving and transmitting radio frequency signals. The Smartphone 1000 may also include a display 1003, such as a touch screen display. The Smartphone 1000 may also include user input devices, such as buttons 1006, to receive user inputs. The mobile device processor 1001 may be any programmable microprocessor, microcomputer or multiple processor chip or chips that can be configured by software instructions (applications) to perform a variety of functions, including the functions of the various embodiments described herein. Typically, software applications may be stored in the internal memory 1002 before they are accessed and loaded into the processor 1001. In some mobile computing devices, additional memory chips (e.g., SIM and SD cards) may be plugged into the mobile device and coupled to the processor 1001. The internal memory 1002 may be a volatile or nonvolatile memory, such as flash memory, or a mixture of both. For the purposes of this description, a general reference to memory refers to all memory accessible by the processor 1001, including internal memory 1002, removable memory plugged into the mobile device, and memory within the processor 1001.

Figure 11:
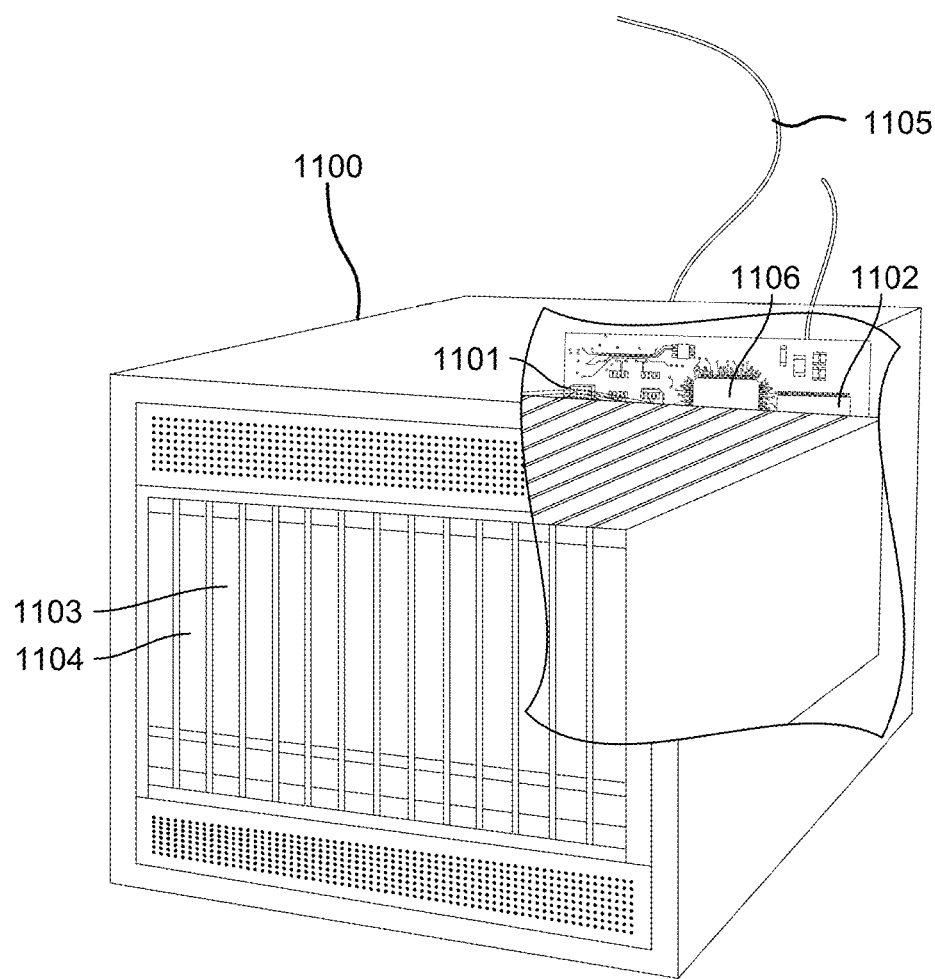
FIG. 11 is a system block diagram of a server suitable for use with various embodiments.

The various embodiments may be implemented on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1106 coupled to the processor 1101. The server 1100 may also include network access ports 1104 coupled to the processor 1101 for establishing data connections with a network 1105, such as a local area network coupled to other broadcast system computers and servers. The processors 1001, 1101 may be any programmable microprocessor, microcomputer or multiple processor chip or chips that can be configured by software instructions (applications) to perform a variety of functions, including the functions of the various embodiments described above. In some devices, multiple processors 1001, 1101 may be provided, such as one processor dedicated to wireless communication functions and one processor dedicated to running other applications. Typically, software applications may be stored in the internal memory 1002, 1102, and 1103 before they are accessed and loaded into the processor 1001, 1101.

The processor 1001, 1101 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1001, 1101 including internal memory or removable memory plugged into the device and memory within the processor 1001, 1101 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "interface," "reference point," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, and/or a network of computers. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on as one or more instructions or code on a non-transitory computer-readable storage medium. The steps of a method or algorithm disclosed herein may be embodied in a processor-executable software module which may reside or be stored on a non-transitory computer-readable storage medium or processor-readable medium. Non-transitory computer-readable and processor-readable storage media may be any available media that may be accessed by a computer or processor. By way of example, and not limitation, such non-transitory computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein.

What is claimed is:

1. A method of performing group-based charging in a communications network, comprising:
   receiving, in a processor of a server computing device that includes an offline charging system (OFCS) component, a communication message that includes a first attribute;
   determining, via the processor of the server computing device, a group of user equipments that includes a first user equipment device that is associated with the received communication message;
   determining, via the processor of the server computing device, a charging attribute state for the determined group of user equipments based on the first attribute included in the received communication message and a second attribute associated with a second user equipment device in the group of user equipments;
   applying a charging event;
   determining whether the charging attribute state of the group of user equipments changed as a result of applying the charging event; and
   notifying a listener component of a new charging attribute state in response to determining that the charging attribute state of the group of user equipments changed.

2. The method of claim 1, wherein determining the charging attribute state for the determined group of user equipments based on the first attribute included in the received communication message and the second attribute associated with the second user equipment device in the group of user equipments further comprises:
   aggregating charging information associated with user equipments within the group of user equipments.

3. The method of claim 1, wherein determining the charging attribute state for the determined group of user equipments based on the first attribute included in the received communication message and the second attribute associated with the second user equipment device in the group of user equipments further comprises:
   obtaining charging information associated with multiple user equipments from multiple sources.

4. The method of claim 3, wherein obtaining charging information associated with multiple user equipments from multiple sources comprises obtaining charging information from an online charging system and an offline charging system.

5. The method of claim 1, wherein:
   the first user equipment device is a machine-to-machine device;
   the charging event is received from one of a charging component and a policy enforcement system component; or
   the charging event relates to a service in a circuit switched domain.

6. The method of claim 1, further comprising:
   sending the charging attribute state to a policy management system component.

7. The method of claim 1, further comprising determining whether the received communication message identifies a group related to a corporate account, wherein determining the group of user equipments that includes the first user equipment device that is associated with the received communication message comprises determining the group of user equipments that includes the first user equipment device in response to determining that the received communication message does not identify a group related to a corporate account.

8. A server computing device that includes an offline charging system (OFCS) component, comprising:
   a processor configured with processor-executable instructions to perform operations comprising:
   receiving a communication message that includes a first attribute;
   determining a group of user equipments that includes a first user equipment device that is associated with the received communication message;
   determining a charging attribute state for the determined group of user equipments based on the first attribute included in the received communication message and a second attribute associated with a second user equipment device in the group of user equipments;
   applying a charging event;
   determining whether the charging attribute state of the group of user equipments changed as a result of applying the charging event; and notifying a listener component of a new charging attribute state in response to determining that the charging attribute state of the group of user equipments changed.

9. The server computing device of claim 8, wherein the processor is configured with processor-executable instructions to perform operations such that determining the charging attribute state for the determined group of user equipments based on the first attribute included in the received communication message and the second attribute associated with the second user equipment device in the group of user equipments further comprises:
aggregating charging information associated with user equipments within the group of user equipments.

10. The server computing device of claim 8, wherein the processor is configured with processor-executable instructions to perform operations such that determining the charging attribute state for the determined group of user equipments based on the first attribute included in the received communication message and the second attribute associated with the second user equipment device in the group of user equipments further comprises:
obtaining charging information associated with multiple user equipments from multiple sources.

11. The server computing device of claim 10, wherein the processor is configured with processor-executable instructions to perform operations such that obtaining charging information associated with multiple user equipments from multiple sources comprises obtaining charging information from an online charging system and an offline charging system.

12. The server computing device of claim 8, wherein:
the first user equipment device is a machine-to-machine device;
the charging event is received from one of a charging component and a policy enforcement system component; or
the charging event relates to a service in a circuit switched domain.

13. The server computing device of claim 8, wherein the processor is configured with processor-executable instructions to perform operations further comprising:
sending the charging attribute state to a policy management system component.

14. The server computing device of claim 8, wherein the processor is configured with processor-executable instructions to perform operations further comprising determining whether the received communication message identifies a group related to a corporate account, and wherein the processor is configured with processor-executable instructions to perform operations such that determining the group of user equipments that includes the first user equipment device that is associated with the received communication message comprises determining the group of user equipments that includes the first user equipment device in response to determining that the received communication message does not identify a group related to a corporate account.

15. A non-transitory server-readable storage medium having stored thereon server-executable configured cause a server that includes an offline charging system (OFCS) component to perform operations comprising:
receiving a communication message that includes a first attribute;
determining a group of user equipments that includes a first user equipment device that is associated with the received communication message;
determining a charging attribute state for the determined group of user equipments based on the first attribute included in the received communication message and a second attribute associated with a second user equipment device in the group of user equipments;
applying a charging event;
determining whether the charging attribute state of the group of user equipments changed as a result of applying the charging event; and
notifying a listener component of a new charging attribute state in response to determining that the charging attribute state of the group of user equipments changed.

16. The non-transitory server-readable storage medium of claim 15, wherein the stored processor-executable software instructions are configured to cause a processor to perform operations such that determining the charging attribute state for the determined group of user equipments based on the first attribute included in the received communication message and the second attribute associated with the second user equipment device in the group of user equipments further comprises:
aggregating charging information associated with user equipments within the group of user equipments.

17. The non-transitory server-readable storage medium of claim 15, wherein the stored processor-executable software instructions are configured to cause a processor to perform operations such that determining the charging attribute state for the determined group of user equipments based on the first attribute included in the received communication message and the second attribute associated with the second user equipment device in the group of user equipments further comprises:
obtaining charging information associated with multiple user equipments from multiple sources.

18. The non-transitory server-readable storage medium of claim 17, wherein the stored processor-executable software instructions are configured to cause a processor to perform operations such that obtaining charging information associated with multiple user equipments from multiple sources comprises obtaining charging information from an online charging system and an offline charging system.

19. The non-transitory server-readable storage medium of claim 15, wherein:
the first user equipment device is a machine-to-machine device;
the charging event is received from one of a charging component and a policy enforcement system component; or
the charging event relates to a service in a circuit switched domain.

20. The non-transitory server-readable storage medium of claim 15, wherein the stored processor-executable software instructions are configured to cause a processor to perform operations further comprising:
sending the charging attribute state to a policy management system component.

21. The non-transitory server-readable storage medium of claim 15, wherein the stored processor-executable software instructions are configured to cause a processor to perform operations further comprising determining whether the received communication message identifies a group related to a corporate account, wherein determining the group of user equipments that includes the first user equipment device that is associated with the received communication message comprises determining the group of user equipments that includes the first user equipment device in response to determining that the received communication message does not identify a group related to a corporate account.

* * * * *